Dec. 10, 1968 P. R. WOODFORD ET AL 3,415,470

MOUNTING SYSTEM

Filed Nov. 17, 1965

INVENTORS
Philip R. Woodford
Edward J. Stravena
Richard A. John
Ralph Hammar  Attorney

United States Patent Office 3,415,470
Patented Dec. 10, 1968

3,415,470
MOUNTING SYSTEM
Philip R. Woodford, Edward J. Straneva, and Richard A. John, Erie, Pa., assignors to Lord Corporation, Erie, Pa., a corporation of Pennsylvania
Filed Nov. 17, 1965, Ser. No. 508,286
4 Claims. (Cl. 248—5)

ABSTRACT OF THE DISCLOSURE

A mounting system having supporting and supported members connected by resilient mountings is damped by a viscous fluid filling the annular space between a cavity in one member and a stud on the other member.

---

This invention is a mounting system which introduces a substantial amount of damping restraining for large dynamic and shock motions (usually low frequency) and which has relatively little damping for smaller dynamic motions (usually higher frequencies). This permits the use of a soft suspension obtaining exceptionally good vibration isolating characteristics at the higher operating frequencies without sacrificing stability at lower frequencies.

In a preferred form, one of the supporting and supported members has a bore and the other member has a stud extending through and spaced from the bore. The resilient suspension is obtained by elastomeric sandwich mountings at each end of the bore and connected in load carrying relation between the stud and the first member. The damping is provided by a viscous fluid filling the space between the stud and the bore. Vanes on the stud may increase the damping.

Figure 1:
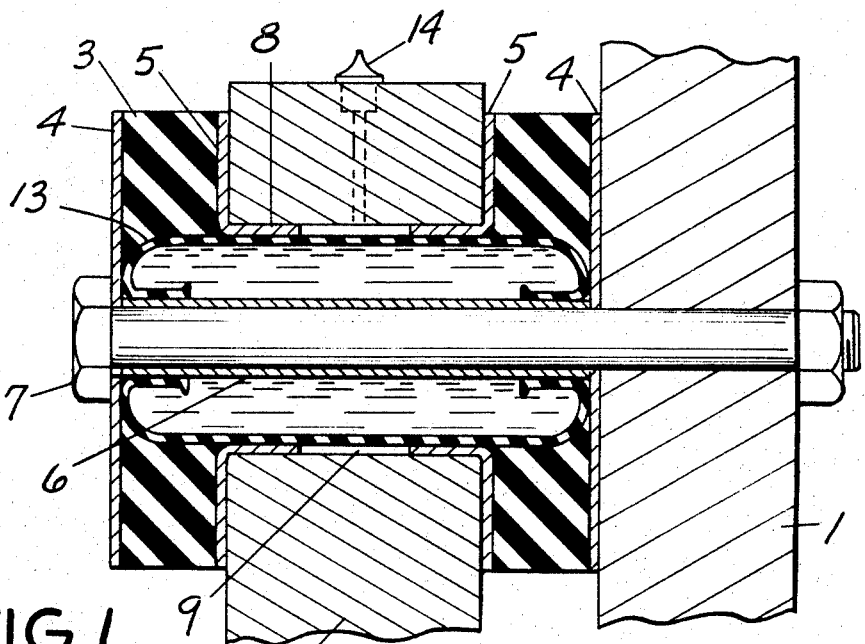
Figure 2:
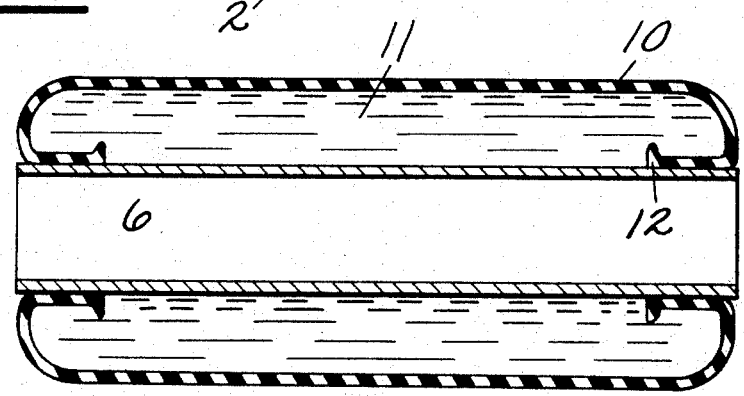
Figure 4:
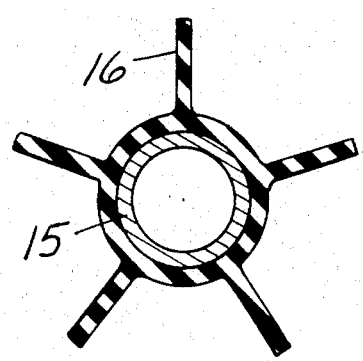
Figure 3:
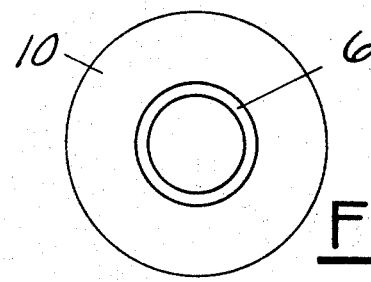

In the drawing, FIG. 1 is a fragmentary sectional view through a mounting system, FIG. 2 is an enlarged longitudinal section through the damping element, FIG. 3 is an end view of the damping element, and FIG. 4 is a sectional view through a modified inner member for the damping element.

A preferred form of the invention is shown applied to a mounting system having supporting and supported members 1 and 2. When used for aircraft engines, 2 could be an engine bracket and 1 could be a supporting bracket on the airframe. On opposite sides of the bracket 2 are sandwich mountings, each comprising a body 3 of suitable elastomer sandwiched between and bonded to opposing faces of metal end plates 4 and 5. The end plates 4 are bolted to a tubular spacer 6 by a through bolt or stud 7 extending through the member 1. When the bolt is tightened, the end plates 4 and the spacer 6 are rigidly fixed to the member 1. The annular end plates 5 have tubular flanges 8 seated in opposite ends of a bore 9 extending through the member 2. The tightening of the bolt 7 places the elastomeric bodies 3 under compression and holds the tubular extensions 8 seated in the bore 9. The inside diameter of the tubular sleeves 8 is substantially greater than the outside diameter of the tubular spacer 6 so there is a substantial clearance space permitting motion of the bracket 2 transverse to the bolt 7. Relative motion in this direction stresses the elastomer in shear, providing a relatively soft suspension desirable for vibration isolation. The parts so far described are or may be of common construction and may differ substantially in appearance from the specific construction described.

With a soft suspension, under resonance and shock conditions the excursion of the member 2 relative to the member 1 may be sufficient to cause impact of the member 2 against the spacer sleeve 6. This excursion usually takes place at low frequencies. While this large excursion can be avoided by stiffening the sandwich mountings, this is undesirable because it increases the system resonant frequency and decreases the vibration isolation at the higher operating frequencies.

In order to restrain the relative motion between the members 1 and 2 at the lower frequencies, particularly near resonances, while at the same time introducing little or no change in the isolation at the higher frequencies, a flexible elastomeric tubular member 10 of outside diameter comparable with the inside diameter of the sleeves 8 is fixed to the spacer sleeve 6 and is filled with a viscous liquid 11. The liquid 11 may be of syrupy consistency, in which case its viscosity is in the range of 10,000 to several million centistokes, or it may have a pasty or semi-solid consistency with even higher viscosity. The choice of the liquid or fluid or flowable fill 11 is determined by the quantity of damping required and the clearance between sleeve 6 and the inside diameter of tubular extensions 8. Even an extremely viscous liquid fill is flowable in the sense that it will assume any desired shape. The envelope 10 is flexible and resilient and tends to return to the shape illustrated. The function of the envelope 10 is to confine the fluid fill 11 and to make the assembly self-contained, easy to ship and to install. Leakage of the fluid fill 11 is prevented by the inturned ends 12 of the resilient sleeve 10 which have a resilient grip upon the sleeve 6. Hydraulic pressure from the fill 11 supplements the sealing contact between the inturned ends 12 and the exterior of the spacing sleeve 6. An adhesive can be used between the inturned ends 12 and sleeve 6 to further insure against leakage before installation.

When the FIG. 2 spacer is installed as shown in FIG. 1, the exterior of the elastomeric envelope 10 is in contact with the nipples 8 at the center of the bore 9 and the ends of the elastomeric sleeve 10 are in contact with cored out inner surfaces 13 of the elastomeric bodies 3. This means that the hydraulic pressure of the fluid fill 11 is applied to the surfaces 13 of the elastomeric bodies so that thermal expansion of the fluid fill will be accommodated by deflection of the elastomeric bodies. Usually the enclosed cavity around the spacer 6 is not completely filled so that there is some clearance into which the fluid 11 can expand before exerting pressure on the elastomeric bodies 3. This clearance also allows spacer 6 to move through small motion without contacting the viscous fluid.

The flexible envelope 10 is a convenient enclosure for the fluid 11 so that the assembly consisting of the spacer 6, the envelope 10 and the fluid fill can be sold as a repair or replacement part. Once the assembly is installed, the envelope 10 is not needed if there is an adequate seal between the metal plates 4 and 5 and the bracket 2 and bolt 7. Considering the viscous nature of the fluid fill, the pressure fit illustrated in FIG. 1, usually provides a fluid tight seal. There is usually a skin of elastomer on the metal plates 4, 5 which assists in making a fluid tight seal. However, if the pressure fit did not provide a fluid tight seal, supplementary gaskets or packing could be used. Alternatively, the envelope 10 could be omitted and the viscous liquid could then be introduced into the annular cavity between the stud 7 and the bore 9 through a fitting 14. In order to insure a complete fill, a bleed opening (not shown) may be provided.

Under vibrating conditions, the primary motion is in a direction transverse to the bolt 7 or in the direction in which the elastomeric bodies 3 are softest. The damping is effected by moving the viscous liquid 11 past the spacer 6. In order to increase the resistance to such movement, the structure shown in FIG. 4 may be used where the spacer 15 corresponding to the spacer 6 has bonded on its outer surface elastomeric vanes 16 having a damping action which introduce resistance to the flow of the viscous liquid and thereby increase the friction damping.

The vanes 16 resist the flow but still permit the motion since the vanes are easily deflected. The vanes 16 may be enclosed by the envelope 10 or may merely extend into the cavity between the spacer and the bore 9.

What is claimed as new is:

1. A mounting system comprising supporting and supported members, one member having a bore, the other member having a stud in telescoping relation to and spaced from the interior walls of the bore, an elastomeric sandwich mounting associated with each end of the bore, each mounting comprising a first annular plate fixed and sealed to said one member at the associated end of the bore, a second plate remote from the first plate fixed and sealed to the stud, and an annular body of elastomer sandwiched between and bonded to the first and second plates and defining in association with said one member an annular cavity between the stud and the bore, and a viscous fluid fill in the cavity.

2. The mounting system of claim 1 having flexible vanes within the cavity on the stud for retarding flow of the fluid.

3. The mounting system of claim 1 having at the center of said annular cavity a tubular spacer telescoped over the stud and clamped between the second plates, and a tubular envelope of flexible material sealed at its ends to the spacer and engaging said one member and said annular bodies of elastomer and filled with said viscous fluid.

4. The mounting system of claim 1 having flexible vanes projecting from the spacer for retarding flow of the fluid.

References Cited

UNITED STATES PATENTS

| 2,351,427 | 6/1944 | Henshaw | 248—5 |
| 2,370,559 | 2/1945 | Markey | 248—5 |
| 2,460,586 | 2/1949 | Keetch | 248—5 |
| 3,154,273 | 10/1964 | Paulsen | 248—22 |

OTHER REFERENCES

German printed application, 1,051,578, February 1959.

ROY D. FRAZIER, *Primary Examiner.*

FRANK DOMOTOR, *Assistant Examiner.*

U.S. Cl. X.R.

188—1; 248—9, 15